United States Patent
Griffith et al.

(10) Patent No.: US 6,448,206 B1
(45) Date of Patent: Sep. 10, 2002

(54) SEALING SUBTERRANEAN ZONES

(75) Inventors: James E. Griffith, Duncan, OK (US);
Ricky A. Cox, Comanche, OK (US);
Jiten Chatterji, Duncan, OK (US);
Bobby J. King, Duncan, OK (US);
Roger S. Cromwell, Walters, OK (US);
John L. Dennis, Jr., Marlow, OK (US)

(73) Assignee: Halliburton Energy Services, Inc., Duncan, OK (US)

(*) Notice: Subject to any disclaimer, the term of this patent is extended or adjusted under 35 U.S.C. 154(b) by 0 days.

(21) Appl. No.: 09/942,850

(22) Filed: Aug. 30, 2001

Related U.S. Application Data

(60) Division of application No. 09/704,633, filed on Nov. 2, 2000, now Pat. No. 6,328,106, which is a continuation-in-part of application No. 09/244,820, filed on Feb. 4, 1999, now Pat. No. 6,271,181.

(51) Int. Cl.$^7$ .......................... C09K 3/00; C09K 7/00; E21B 33/13
(52) U.S. Cl. .................. 507/219; 507/221; 507/231; 166/295; 175/72; 523/130
(58) Field of Search .................. 507/219, 221, 507/231; 166/295; 175/72; 523/130

(56) References Cited

U.S. PATENT DOCUMENTS

| | | | |
|---|---|---|---|
| 2,637,692 A | 5/1953 | Nahin | 252/8.5 |
| 2,675,353 A | 4/1954 | Dawson | 252/8.5 |
| 2,815,079 A | 12/1957 | Goins, Jr. et al. | 166/29 |
| 3,082,823 A | 3/1963 | Hower | 166/29 |
| 3,208,525 A | 9/1965 | Caldwell et al. | 166/33 |
| 3,251,414 A | 5/1966 | Willman | 166/33 |
| 3,308,884 A | 3/1967 | Robichaux | 166/33 |
| 3,310,111 A | 3/1967 | Pavlich et al. | 166/33 |
| 3,310,511 A | 3/1967 | Reinert | 260/29.2 |
| 3,416,604 A | 12/1968 | Rensvold | 166/33 |
| 3,467,208 A | 9/1969 | Kelly, Jr. | 175/72 |
| 3,612,181 A | 10/1971 | Brooks, Jr. | 166/295 |
| 3,705,116 A | 12/1972 | Vargin et al. | 260/2.5 B |
| 3,724,551 A | 4/1973 | Troscinski et al. | 166/295 |
| 3,724,564 A | 4/1973 | Messenger | 175/72 |
| 3,730,271 A | 5/1973 | Gall | 166/294 |
| 3,750,768 A | 8/1973 | Suman, Jr. et al. | 175/72 |
| 3,763,070 A | 10/1973 | Shearing | 260/29.2 TN |
| 3,769,250 A | 10/1973 | Nikles, Jr. et al. | 260/29.2 EP |
| 3,782,466 A | 1/1974 | Lawson et al. | 166/295 |
| 3,894,977 A | 7/1975 | Brown et al. | 260/18 EP |
| 3,933,204 A | 1/1976 | Knapp | 166/295 |
| 3,960,801 A | 6/1976 | Cole et al. | 260/33.6 EP |
| 3,976,135 A | 8/1976 | Anderson | 166/276 |
| 4,042,031 A | 8/1977 | Knapp | 166/276 |
| 4,072,194 A | 2/1978 | Cole et al. | 166/295 |
| 4,101,474 A | 7/1978 | Copeland et al. | 260/13 |
| 4,107,112 A | 8/1978 | Latta, Jr. et al. | 260/18 EP |
| 4,113,015 A | 9/1978 | Meijs | 166/295 |
| 4,127,173 A | 11/1978 | Watkins et al. | 166/276 |
| 4,173,999 A | 11/1979 | Messenger | 166/293 |
| 4,189,002 A | 2/1980 | Martin | 166/295 |
| 4,199,484 A | 4/1980 | Murphey | 260/13 |
| 4,215,001 A | 7/1980 | Elphingstone et al. | 252/8.55 C |
| 4,216,829 A | 8/1980 | Murphey | 166/276 |
| 4,220,566 A | 9/1980 | Constein et al. | 260/13 |
| 4,272,384 A | 6/1981 | Martin | 252/8.55 R |
| 4,315,703 A | 2/1982 | Gasper | 405/264 |

(List continued on next page.)

FOREIGN PATENT DOCUMENTS

| | | | |
|---|---|---|---|
| DE | 2840874 | 4/1980 | |
| DE | 3135892 A1 | 9/1980 | ............. C08L/1/26 |
| DE | 3414229 | 10/1985 | |
| EP | 0 091 377 A1 | 10/1983 | |
| EP | 0 280 341 A1 | 1/1988 | ........... E21B/43/26 |
| EP | 522931 | 1/1993 | |
| EP | 0 553 566 A1 | 8/1993 | ........... E21B/43/04 |
| EP | 786439 | 7/1997 | |
| EP | 0 802 253 A1 | 10/1997 | ............ C09K/7/02 |
| FR | 1 315 462 | 12/1962 | |
| FR | 2 701 733 | 2/1993 | ........... E21B/43/32 |
| GB | 1019122 | 2/1966 | ............. E02D/3/14 |
| GB | 2 108 175 A | 5/1983 | ............. C09K/7/06 |
| JP | 47034888 | 11/1972 | |
| JP | 60011255 | 1/1985 | |
| JP | 05032444 | 2/1993 | |
| JP | 07257952 | 10/1995 | |
| JP | 08-067542 | * 3/1996 | |
| JP | 08198654 | 8/1996 | |
| JP | 10226553 | 8/1998 | |
| JP | 11246783 | 9/1999 | |
| RO | 112720 | 12/1997 | |
| WO | WO 81/00874 | 4/1981 | ........... E21B/21/12 |
| WO | WO 91/02703 | 3/1991 | ........... C04B/24/24 |
| WO | WO 94/12445 | 6/1994 | ........... C04B/26/18 |
| WO | WO 96/00762 | 1/1996 | ............ C09K/7/06 |

OTHER PUBLICATIONS

American Petroleum Institute; New York, New York; XP–002069564.
Abstract No. XP–002069565; Derwent Publications, Ltd.
Abstract No. XP–002069604; Derwent Publications, Ltd.
Abstract No. XP–002069605; Derwent Publications, Ltd.
Abstract No. XP–002069606; Derwent Publications, Ltd.
Abstract No. XP–002145741; Derwent Publications, Ltd.
Abstract No. XP–002145742; Derwent Publications, Ltd.
Abstract No. XP–002146282; Derwent Publications, Ltd.
Abstract No. XP–002146283; Derwent Publications, Ltd.
Paper entitled "Conditioning of Spent Ion Exchange Resins by Embedding In Compound Matrixes" by C.J. Kertesz, Waste Management, Tucson, AZ 1991, vol. 2, 381–6.

*Primary Examiner*—Philip Tucker
(74) *Attorney, Agent, or Firm*—Craig W. Roddy; C. Clark Dougherty, Jr.

(57) ABSTRACT

The present invention provides improved compositions and methods of using the compositions for sealing subterranean zones. One composition of the invention is comprised of water, an aqueous rubber latex, an organophilic clay, sodium carbonate, an epoxy resin and a hardening agent for said epoxy resin.

13 Claims, No Drawings

U.S. PATENT DOCUMENTS

| | | | |
|---|---|---|---|
| 4,336,842 A | 6/1982 | Graham et al. | 166/276 |
| 4,339,000 A | 7/1982 | Cronmiller | 166/295 |
| 4,360,120 A | 11/1982 | Samuel et al. | 524/494 |
| 4,367,300 A | 1/1983 | Aoki et al. | 524/2 |
| 4,368,828 A | 1/1983 | Samuel et al. | 220/81 R |
| 4,383,054 A | 5/1983 | Schulze et al. | 523/131 |
| 4,397,354 A | 8/1983 | Dawson et al. | 166/294 |
| 4,439,328 A | 3/1984 | Moity | 252/8.5 LC |
| 4,442,241 A | 4/1984 | Drake et al. | 523/130 |
| 4,483,888 A | 11/1984 | Wu | 427/336 |
| 4,489,785 A | 12/1984 | Cole | 166/295 |
| 4,503,170 A | 3/1985 | Drake et al. | 523/130 |
| 4,532,052 A | 7/1985 | Weaver et al. | 252/8.55 R |
| 4,537,918 A | 8/1985 | Parcevaux et al. | 523/130 |
| 4,558,075 A | 12/1985 | Suss et al. | 523/216 |
| 4,566,977 A | 1/1986 | Hatfield | 252/8.5 C |
| 4,569,971 A | 2/1986 | Sasse et al. | 525/109 |
| 4,620,993 A | 11/1986 | Suss et al. | 427/407.1 |
| 4,633,950 A | 1/1987 | Delhommer et al. | 166/295 |
| 4,643,255 A | 2/1987 | Sandiford et al. | 166/295 |
| 4,665,988 A | 5/1987 | Murphey et al. | 166/295 |
| 4,718,492 A | 1/1988 | Van Laar | 166/295 |
| 4,740,319 A | 4/1988 | Patel et al. | 252/8.515 |
| 4,741,404 A | 5/1988 | Walles et al. | 166/300 |
| 4,773,482 A | 9/1988 | Allison | 166/270 |
| 4,785,884 A | 11/1988 | Armbruster | 166/280 |
| 4,829,100 A | 5/1989 | Murphey et al. | 523/131 |
| 4,836,940 A | 6/1989 | Alexander | 252/8.512 |
| 4,921,047 A | 5/1990 | Summers et al. | 166/276 |
| 4,964,465 A | 10/1990 | Surles | 166/295 |
| 4,972,906 A | 11/1990 | McDaniel | 166/276 |
| 5,090,478 A | 2/1992 | Summers | 166/278 |
| 5,095,987 A | 3/1992 | Weaver et al. | 166/276 |
| 5,107,928 A | 4/1992 | Hilterhaus | 166/293 |
| 5,133,409 A | 7/1992 | Bour et al. | 166/293 |
| 5,151,131 A | 9/1992 | Burkhalter et al. | 106/822 |
| 5,159,980 A | 11/1992 | Onan et al. | 166/294 |
| 5,162,060 A | 11/1992 | Bredow et al. | 106/808 |
| 5,168,928 A | 12/1992 | Terry et al. | 166/292 |
| 5,211,234 A | 5/1993 | Floyd | 166/276 |
| 5,213,161 A | 5/1993 | King et al. | 166/293 |
| 5,232,741 A | 8/1993 | Wu | 427/386 |
| 5,232,961 A | 8/1993 | Murphey et al. | 523/414 |
| 5,293,938 A | 3/1994 | Onan et al. | 166/293 |
| 5,306,739 A | 4/1994 | Lucey | 522/42 |
| 5,314,023 A | 5/1994 | Dartez et al. | 166/295 |
| 5,335,726 A | 8/1994 | Rodrigues | 166/295 |
| 5,337,824 A | 8/1994 | Cowan | 166/293 |
| 5,358,044 A | 10/1994 | Hale et al. | 166/293 |
| 5,358,051 A | 10/1994 | Rodrigues | 166/295 |
| 5,361,841 A | 11/1994 | Hale et al. | 166/293 |
| 5,361,842 A | 11/1994 | Hale et al. | 166/293 |
| 5,363,918 A | 11/1994 | Cowan et al. | 166/295 |
| 5,368,102 A | 11/1994 | Dewprashad et al. | 166/276 |
| 5,372,641 A | 12/1994 | Carpenter | 106/714 |
| 5,373,901 A | 12/1994 | Norman et al. | 166/300 |
| 5,377,757 A | 1/1995 | Ng | 166/277 |
| 5,388,648 A | 2/1995 | Jordan, Jr. | 166/380 |
| 5,428,178 A | 6/1995 | Zuzich et al. | 549/378 |
| 5,447,197 A | 9/1995 | Rae et al. | 166/293 |
| 5,458,195 A | 10/1995 | Totten et al. | 166/293 |
| 5,547,027 A | 8/1996 | Chan et al. | 166/295 |
| 5,547,506 A | 8/1996 | Rae et al. | 106/730 |
| 5,559,086 A | 9/1996 | Dewprashad et al. | 507/219 |
| 5,569,324 A | 10/1996 | Totten et al. | 106/696 |
| 5,588,488 A | 12/1996 | Vijn et al. | 166/293 |
| 5,609,207 A | 3/1997 | Dewprashad et al. | 166/276 |
| 5,629,270 A | 5/1997 | Van Slyke | 507/125 |
| 5,663,123 A | 9/1997 | Goodhue, Jr. et al. | 507/225 |
| 5,688,844 A | 11/1997 | Chatterji et al. | 524/8 |
| 5,692,566 A | 12/1997 | Surles | 166/295 |
| 5,712,314 A | 1/1998 | Surles et al. | 521/41 |
| 5,738,463 A | 4/1998 | Onan | 405/154 |
| 5,795,924 A | 8/1998 | Chatterji et al. | 523/130 |
| 5,820,670 A | 10/1998 | Chatterji et al. | 106/727 |
| 5,873,413 A | 2/1999 | Chatterji et al. | 166/293 |
| 5,875,844 A | 3/1999 | Chatterji et al. | 166/293 |
| 5,875,845 A | 3/1999 | Chatterji et al. | 166/293 |
| 5,875,846 A | 3/1999 | Chatterji et al. | 166/293 |
| 5,911,282 A | 6/1999 | Onan et al. | 175/72 |
| 5,913,364 A | 6/1999 | Sweatman | 166/281 |
| 5,957,204 A | 9/1999 | Chatterji et al. | 166/295 |
| 5,969,006 A | 10/1999 | Onan et al. | 523/166 |
| 6,006,835 A | 12/1999 | Onan et al. | 166/295 |
| 6,006,836 A | 12/1999 | Chatterji et al. | 166/295 |
| 6,059,035 A | 5/2000 | Chatterji et al. | 166/293 |
| 6,098,711 A | 8/2000 | Chatterji et al. | 166/294 |
| 6,124,246 A | 9/2000 | Heathman et al. | 507/219 |
| 6,231,664 B1 | 5/2001 | Chatterji et al. | 106/724 |
| 6,234,251 B1 | 5/2001 | Chatterji et al. | 166/295 |
| 6,244,344 B1 | 6/2001 | Chatterji et al. | 166/295 |
| 6,258,757 B1 | 7/2001 | Sweatman et al. | 507/219 |
| 6,271,181 B1 | 8/2001 | Chatterji et al. | 507/219 |
| 6,279,652 B1 | 8/2001 | Chatterji et al. | 166/194 |
| 6,328,106 B1 * | 12/2001 | Griffith et al. | 166/295 |
| 6,330,917 B2 * | 12/2001 | Chatterji et al. | 166/295 |
| 6,350,309 B2 | 2/2002 | Chatterji et al. | 106/677 |
| 6,367,549 B1 | 4/2002 | Chatterji et al. | 166/292 |
| 6,401,817 B1 * | 6/2002 | Griffith et al. | 166/295 |
| 2001/0032723 A1 * | 10/2001 | Chatterji | 166/295 |

* cited by examiner

SEALING SUBTERRANEAN ZONES

This application is a Divisional of application Ser. No. 09/704,633 filed on Nov. 2, 2000, now U.S. Pat. No. 6,328,106 which is a Continuation-In-Part of application Ser. No. 09/244,820 filed on Feb. 4, 1999, U.S. Pat. No. 6,271,181.

BACKGROUND OF THE INVENTION

1. Field of the Invention

The present invention relates to improved compositions for sealing subterranean zones and methods of utilizing the compositions.

2. Description of the Prior Art

In the drilling of oil and gas wells using the rotary drilling method, drilling fluid is circulated through the drill string and drill bit and then back to the surface by way of the well bore being drilled. The drilling fluid maintains hydrostatic pressure on the subterranean zones through which the well bore is drilled and circulates cuttings out of the well bore. During such drilling, subterranean vugs, fractures and other highly permeable zones are often encountered whereby the drilling fluid circulation is lost into the zones and drilling operations must be terminated while remedial steps are taken. Also, when a subterranean zone is penetrated containing fluids under pressure which exceeds the hydrostatic pressure exerted on the zone by the drilling fluid, formation fluid crossflows and/or underground blow-outs can and often do occur.

Heretofore, a variety of compositions have been developed and used for combating lost circulation, crossflow and underground blow-out problems. However, such compositions have often been unsuccessful due to delayed and inadequate viscosity development by the compositions. For example, a variety of compositions containing hydraulic cement or the like have been used in attempts to stop lost circulation. The lost circulation is usually the result of encountering weak subterranean zones that contain natural fractures and/or are fractured by drilling fluid pressures and rapidly break down. When a cement or other slow setting composition is squeezed into the zone, the delay in developing high viscosity allows the sealing composition to be diluted and displaced into the zone whereby it bypasses the fractures and vugs causing the lost circulation. The same type of problem often occurs when crosslinked hydrated gels and other similar sealing compositions are utilized.

Thus, there are needs for improved compositions and methods of sealing subterranean zones using the compositions whereby the compositions develop ultra high viscosities in a few seconds or minutes and thereafter harden into firm but resilient sealing masses.

SUMMARY OF THE INVENTION

Improved compositions and methods of using the composition for sealing subterranean zones are provided which overcome the deficiencies of the prior art and meet the needs described above. The sealing compositions and methods are particularly suitable for sealing subterranean zones containing drilling fluids formed of oil, water containing divalent cations and/or water-in-oil emulsions, known in the art as inverted emulsions.

A first sealing composition of this invention for sealing zones containing oil or water based drilling fluids is basically comprised of water, an aqueous rubber latex, an organophilic clay, sodium carbonate, an epoxy resin and a hardening agent for the epoxy resin. The composition can also include one or more latex stabilizers, dispersing agents, biopolymers, defoaming agents, foaming agents, emulsion breakers, fillers, rubber vulcanizing agents and the like.

A second sealing composition of this invention for sealing subterranean zones containing oil or water based drilling fluids is basically comprised of an aqueous rubber latex, a latex stabilizing surfactant, an epoxy resin and a hardening agent for the epoxy resin.

A third inventive sealing composition for sealing subterranean zones containing water based drilling fluids is basically comprised of a water swellable clay, a silane coupling agent, an epoxy resin and a hardening agent.

When the first and second sealing compositions described above contact oil, water containing divalent cations or oil-water emulsions in a well bore, the rubber latex is destabilized whereby the rubber is precipitated thereby forming the sealing composition into a viscous mass. When the sealing composition includes an organophilic clay, the organophilic clay simultaneously reacts with the oil to instantly form an ultra-high viscosity rubbery mass. The third sealing composition described above includes a water swellable clay which forms the composition into a viscous mass when it contacts water. The viscous masses formed by the sealing compositions remain in the zones to be sealed until the epoxy resin in the sealing compositions is hardened by the hardening agent which forms the compositions into firm but resilient sealing masses which retain their shape, have compressive strength and effectively seal the subterranean zones.

The methods of this invention basically comprise the steps of preparing a sealing composition of this invention, introducing the sealing composition into a subterranean zone to be sealed and allowing the sealing composition to form a firm but resilient sealing mass in the subterranean zone.

It is, therefore, a general object of the present invention to provide improved compositions for sealing subterranean zones and methods of using the compositions.

Other and further objects, features and advantages of the present invention will be readily apparent to those skilled in the art upon a reading of the description of preferred embodiments which follows.

DESCRIPTION OF PREFERRED EMBODIMENTS

As mentioned above, in the drilling of wells, subterranean zones are often encountered which contain high incidences of natural vugs and fractures. As a result, drilling fluid circulation is often lost which requires the termination of the drilling and the implementation of remedial procedures which are often of long duration and high cost. Such remedial procedures have heretofore involved the placement of hardenable compositions such as Portland cement compositions or crosslinked stiff gels and the like in the lost circulation zone. However, as mentioned above, because such compositions require considerable time to harden or gel, successful plugging of the zone often does not take place. In addition to drilling fluid loss circulation zones, zones containing pressurized fluids can be encountered which cause gas, oil and/or water crossbows that dilute and wash away sealing compositions. Also, underground blow-outs at low to high formation fluid flow rates can take place.

The present invention provides improved compositions for sealing subterranean zones and terminating the loss of drilling fluid, crossflows and/or underground blow-outs. The compositions are particularly suitable for use in wells containing oil, water containing divalent cations and/or water-in-oil emulsions. When a composition of this invention contacts oil or water containing divalent cations in the well bore, it instantly forms a viscous sealing mass. As the viscous sealing mass is displaced through the well bore, it enters and seals vugs, fractures and other highly permeable zones through which fluid is lost. Upon entering such zones, the viscous sealing composition is retained in the zones long enough for the epoxy resin therein to harden and form a firm but resilient sealing mass which retains it shape, has compressive strength and effectively seals the zones.

The sealing compositions of this invention are self diverting and plug multiple weak zones in a single well treatment. When a well contains a crossflow or underground blow-out, the sealing compositions plug all the lower pressure weak zones penetrated by the well bore and as the pressure in the well bore is increased, the crossflow or blow-out zone is also plugged. The resulting sealed well bore achieved by the sealing compositions of this invention can hold higher drilling fluid weights and the sealing compositions produce a wedging effect in plugged fractures that increases the integrity of the entire sealed formation or zone.

A first sealing composition of the present invention is basically comprised of water, an aqueous rubber latex, an organophilic clay, sodium carbonate, an epoxy resin and a hardening agent for the epoxy resin. The aqueous rubber latex present in the composition is caused to destabilize by oil or water containing electrolytes such as calcium chloride in the well bore whereby the rubber is precipitated. The organophilic clay simultaneously reacts with oil in the well bore to form a high viscosity rubbery sealing mass. The sodium carbonate in the composition functions to stabilize the rubber latex and prevent precipitation when the latex is mixed with water which contains calcium chloride and the like during the preparation of the composition. Sodium hydroxide can also be added to the composition to prevent precipitation of the latex if the water used to form the composition contains magnesium compounds or other similar latex destabilizing compounds.

The epoxy resin in the compositions is caused to harden by the hardening agent therein whereby the initially formed high viscosity rubbery sealing mass is converted into a firm but resilient sealing mass which has compressive strength and retains its shape in a sealed zone.

The water in the sealing composition which is in addition to the water contained in the aqueous latex is included in the composition to make it pumpable. The water can be from any source provided it does not contain the above mentioned compounds that adversely affect the rubber latex or other components in the composition. However, fresh water is preferred. Generally, the additional water is present in an amount in the range of from about 6% to about 50% by weight of the composition, more preferably in a range of from about 30% to about 42%.

A second sealing composition which is similar to the above described composition is basically comprised of an aqueous rubber latex, a latex stabilizing surfactant, an epoxy resin and a hardening agent for the epoxy resin. The aqueous rubber latex is caused to destabilize by oil or water containing electrolytes in the well bore whereby the rubber is precipitated and a viscous sealing mass is formed. As described above, the viscous sealing mass enters and seals vugs, fractures and other highly permeable zones and is retained in the zones long enough for the epoxy resin therein to harden. The resulting sealing mass retains its shape, has compressive strength and effectively seals and strengthens the zones.

A third inventive sealing composition is basically comprised of a water swellable clay, a silane coupling agent, an epoxy resin and a hardening agent for the epoxy resin. When the water swellable clay contacts water, it swells and forms the sealing composition into a viscous mass which enters and seals vugs, fractures and other highly permeable zones and is retained in the zones long enough for the epoxy resin therein to harden. The resulting sealing mass retains its shape, has compressive strength and effectively seals and strengthens the zones.

A variety of well known rubber materials can be utilized in accordance with the present invention. Such materials are commercially available in aqueous latex form, i.e., aqueous dispersions or emulsions. For example, natural rubber (cis-1,4-polyisoprene) and most of its modified types can be utilized. Synthetic polymers of various types can also be used including styrene/butadiene rubber, cis-1,4-polybutadiene rubber and blends thereof with natural rubber or styrene/butadiene rubber, high styrene resin, butyl rubber, ethylene/propylene rubbers, neoprene rubber, nitrile rubber, cis-1,4-polyisoprene rubber, silicone rubber, chlorosulfonated rubber, polyethylene rubber, epichlorohydrin rubber, fluorocarbon rubber, fluorosilicone rubber, polyurethane rubber, polyacrylic rubber and polysulfide rubber.

Of the various latexes which can be utilized, those prepared by emulsion polymerization processes are preferred. A particularly preferred latex for use in accordance with this invention is a styrene/butadiene copolymer latex emulsion prepared by emulsion polymerization. The aqueous phase of the emulsion is an aqueous colloidal dispersion of the styrene/butadiene copolymer. The latex dispersion usually includes water in an amount in the range of from about 40% to about 70% by weight of the latex, and in addition to the dispersed styrene/butadiene particles, the latex often includes small quantities of an emulsifier, polymerization catalysts, chain modifying agents and the like. The weight ratio of styrene to butadiene in the latex can range from about 10%:90% to about 90%:10%.

It is understood that styrene/butadiene latexes are often commercially produced as terpolymer latexes which include up to about 3% by weight of a third monomer to assist in stabilizing the latex emulsions. The third monomer, when present, generally is anionic in character and includes a carboxylate, sulfate or sulfonate group. Other groups that may be present on the third monomer include phosphates, phosphonates or phenolics. Non-ionic groups which exhibit stearic effects and which contain long ethoxylate or hydrocarbon tails can also be present.

A particularly suitable styrene/butadiene aqueous latex for use in accordance with the present invention has a styrene/butadiene weight ratio of about 25%:75%, and the styrene/butadiene copolymer is suspended in a 50% by weight aqueous emulsion. A latex of this type is available from Halliburton Energy Services of Duncan, Okla. under the trade designation "LATEX 2000™."

When used in the first sealing composition described above which also includes an organophilic clay, sodium carbonate, an epoxy resin and a hardening agent, the aqueous latex is included in the composition in an amount in the range of from about 8% to about 17% by weight of the composition, more preferably in an amount of from about 10% to about 12%.

When used in the second sealing composition described above which also includes a latex stabilizing surfactant, an epoxy resin and a hardening agent, the aqueous latex is included in the composition in an amount in the range of from 30% to about 70% by weight of the composition, more preferably in an amount of from about 40% to about 50%.

While a variety of organophilic clays can be utilized, an alkyl quaternary ammonium bentonite clay is preferred. A particularly suitable alkyl quaternary ammonium bentonite clay for use in accordance with this invention is commercially available from Southern Products, Inc. of Gonzales, Tex. under the tradename "CLAYTONE-II™." The organophilic clay is generally present in the first sealing composition described above in an amount in the range of from about 13% to about 22% by weight of the compositions, more preferably from about 16% to about 19%.

The sodium carbonate which functions as a buffer and prevents destabilization of the rubber latex due to contact with calcium and the like in the mixing water is generally present in the first sealing composition described above in an amount in the range of from about 2.7% to about 4.4% by weight of the compositions, more preferably from 3.3% to about 3.7%.

The compositions of this invention can include various epoxy resins. Preferred epoxy resins are those selected from the condensation products of epichlorohydrin and bisphenol A. A particularly suitable such resin is commercially available from the Shell Chemical Company under the trade designation "EPON®RESIN 828." This epoxy resin has a molecular weight of about 340 and a one gram equivalent of epoxide per about 180 to about 195 grams of resin.

For ease of mixing, the epoxy resin utilized in the first and second sealing compositions described above can be pre-dispersed in a non-ionic aqueous fluid. A non-ionic aqueous dispersion of the epoxy resin, i.e., the above described condensation product of epichlorohydrin and bisphenol A, is commercially available from the Shell Chemical Company under the trade designation "EPI-REZ®-3510-W-60." Another non-ionic aqueous dispersion of an epoxy resin comprised of a condensation product of epichlorohydrin and bisphenol A having a higher molecular weight than the epoxy resin described above is also commercially available from the Shell Chemical Company under the trade designation "EPI-REZ®-3522-W-60." Yet another non-ionic aqueous dispersion of an epoxy resin suitable for use in accordance with the present invention includes an epoxidized bisphenol A novolac resin which has a one gram equivalent of epoxide per about 205 grams of resin. This non-ionic aqueous dispersion of epoxy resin is commercially available from the Shell Chemical Company under the trade designation "EPI-REZ®-5003-W-55."

Of the foregoing non-ionic aqueous dispersions of epoxy resin, the aqueous dispersion of the condensation product of epichlorohydrin and bisphenol A having a molecular weight of about 340 and a one gram equivalent of epoxide per about 180 to about 195 grams of resin is the most preferred.

The epoxy resin utilized is included in the sealing compositions of this invention in an amount in the range of from about 30% to about 70% by weight of the compositions, most preferably in an amount of about 40% to about 50%.

A solvent comprised of one or more aromatic hydrocarbons or a low viscosity epoxide containing liquid or a mixture of such epoxide containing liquids can be utilized to modify the viscosity of the epoxy resin used, e.g., the above described Shell "EPON®RESIN 828," and to add flexibility and resiliency to the epoxy containing sealing composition after hardening. A particularly suitable solvent which is presently preferred is comprised of a mixture of hydrocarbons containing from about 50% to about 99% of one or more aromatic hydrocarbons by weight of the solvent. Such a preferred solvent is commercially available under the tradename "CYCLO SOL 63™" from Shell Chemical Co. of Houston, Tex. An epichlorohydrin/bisphenol A condensation epoxy resin which has been modified with an aromatic solvent and is suitable for use in the above described sealing compositions is commercially available from the Shell Chemical Company under the trade designation "EPSEAL RE®."

When an aromatic solvent or an epoxide containing liquid or mixture of such liquids is included in a sealing composition of this invention to modify the viscosity of an epoxy resin therein, the solvent or epoxide containing liquid or mixture is generally present in an amount in the range of from about 20% to about 40% by weight of the epoxy resin in the sealing composition. An epoxide containing liquid or a mixture of such liquids can also be utilized as the only epoxide source in a sealing composition of this invention.

While various epoxide containing liquids can be used, preferred such liquids are the diglycidyl ether of 1,4-butanediol, the diglycidyl ether of neopentyl glycol and the diglycidyl ether of cyclohexanedimethanol. A suitable epoxide containing liquid comprised of the diglycidyl ether of 1,4-butanediol is commercially available from the Shell Chemical Company under the trade name "HELOXY®67." This epoxide containing liquid has a viscosity at 25° C. in the range of from about 13 to about 18 centipoises, a molecular weight of 202 and a one gram equivalent of epoxide per about 120 to about 130 grams of the liquid. A suitable diglycidyl ether of neopentylglycol is commercially available from Shell Chemical Company under the trade name "HELOXY®68." This epoxide containing liquid has a viscosity at 25° C. in the range of from about 13 to about 18 centipoises, a molecular weight of 216 and a one gram equivalent of epoxide per about 130 to about 140 grams of the liquid. A suitable diglycidyl ether of cyclohexanedimethanol is commercially available from Shell Chemical Company under the trade name "HELOXY®107." This epoxide containing liquid has a viscosity at 25° C. in the range of from about 55 to about 75 centipoises, a molecular weight of 256 and a one gram equivalent of epoxide per about 155 to about 165 grams of the liquid.

When an epoxide containing liquid or mixture is utilized as the only epoxide source in a sealing composition of this invention, the epoxide containing liquid or mixture is generally present in an amount in the range of from about 40% to about 50% by weight of the sealing composition.

A variety of hardening agents, including, but not limited to, aliphatic amines, aliphatic tertiary amines, aromatic amines, cycloaliphatic amines, heterocyclic amines, amidoamines, polyamides, polyethylamines and carboxylic acid anhydrides can be utilized in the compositions of this invention containing the above described epoxy resins. Of these, aliphatic amines, aromatic amines and carboxylic acid anhydrides are the most suitable.

Examples of aliphatic and aromatic amine hardening agents are triethylenetetraamine, ethylenediamine, N-cocoalkyltrimethylenediamine, isophoronediamine, diethyltoluenediamine, and tris(dimethylaminomethylphenol). Examples of suitable carboxylic acid anhydrides are methyltetrahydrophthalic anhydride, hexahydrophthalic anhydride, maleic anhydride, polyazelaic polyanhydride and phthalic anhydride. Of these, triethylenetetraamine, ethylenediamine, N-cocoalkyltrimethylenediamine, isophoronediamine, diethyltoluenediamine and tris(dimethylaminomethylphenol) are preferred, with isophoronediamine, diethyltoluenediamine and tris (dimethylaminomethylphenol) being the most preferred.

The hardening agent or agents utilized are generally included in the sealing compositions of this invention in an amount in the range of from about 5% to about 30% by weight of the compositions.

Another component which can optionally be included in the sealing compositions of this invention is a polymer which hydrates with water and adds viscosity to the compositions to help maintain the solids therein in suspension without adversely affecting the sealing compositions such as by prematurely destabilizing the rubber latex. The polymer is preferably a biopolymer which is not degraded by microorganisms such as bacteria. A particularly preferred biopolymer for use in accordance with this invention which does not adversely affect the sealing compositions is welan gum. When used, the welan gum is included in the sealing compositions in an amount in the range of from about 0.1% to about 0.2% by weight of the compositions.

In order to facilitate the dispersal of solids in the compositions, a dispersing agent can optionally be included therein. While a variety of dispersing surfactants can be used, preferred dispersing surfactants are the condensation reaction product of acetone, formaldehyde and sodium sulfite, the condensation reaction product of sodium naphthalene sulfonate and formaldehyde and sodium-N-methyl-N-oleyltaurine mixed with sulfite liquor. Of these, the condensation reaction product of acetone, formaldehyde and sodium sulfite is most preferred. When used, the dispersing agent is included in the compositions of this invention in an amount in the range of from about 0.35% to about 0.55% by weight of the compositions, more preferably from about 0.4% to about 0.47%.

Another additive which can optionally be utilized is a defoaming agent which prevents foaming during mixing and pumping of the sealing compositions. Because the aqueous rubber latex includes surfactants for emulsifying the latex which also function as foaming agents, a large bubble, unstable foam can be produced when the rubber latex is mixed with water and the other components of the sealing compositions. The defoaming agent can comprise any of the compounds well known for such capabilities such as the polyol silicon compounds. A preferred such defoaming agent is polydimethylsiloxane which is commercially available from Halliburton Energy Services of Duncan, Okla., under the trade designation "D-AIR™3." When used, the defoaming agent is generally included in the sealing compositions in an amount in the range of from about 0.4% to about 1.8% by weight of the compositions, more preferably from about 0.8% to about 1.2%.

In order to prevent the aqueous latex from prematurely coagulating and increasing the viscosities of the sealing compositions of this invention due to contact with coagulation causing compounds in the water used or other source, an effective amount of a latex stabilizing surfactant can be included in the compositions. Latex stabilizing surfactants function to prevent latex coagulation, and those which are particularly suitable for use in accordance with this invention are surfactants having the formula

wherein R is an alkyl group having from about 5 to about 30 carbon atoms, Ph is phenyl and m is an integer in the range of from about 5 to about 50. Additional particularly suitable surfactants have the general formula

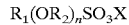

wherein $R_1$ is selected from the group consisting of alkyl groups having from 1 to about 30 carbon atoms, cycloalkyl groups having 5 or 6 carbon atoms, $C_1$–$C_4$ alkyl substituted cycloalkyl groups, phenyl, alkyl substituted phenyl of the general formula $(R_3)_a$Ph— wherein Ph is phenyl, $R_3$ is an alkyl group having from 1 to about 18 carbon atoms and a is an integer of from 1 to 3, and phenyl-alkyl groups wherein the alkyl groups have from 1 to about 18 carbon atoms and the phenyl-alkyl groups have a total of from about 8 to about 28 carbon atoms. $R_2$ is a substituted ethylene group of the formula —$CH_2CH_2R_4$ wherein $R_4$ is selected from hydrogen, methyl, ethyl or mixtures thereof, n is a number from 0 to about 40 provided that when $R_1$ is phenyl or alkyl substituted phenyl n is at least one, and X is any compatible cation.

A preferred surfactant in the above defined group is ethoxylated nonylphenyl containing in the range of from about 20 to about 30 moles of ethylene oxide. Another preferred surfactant in the group is a sodium salt having the general formula

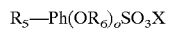

wherein $R_5$ is an alkyl group having in the range of from 1 to about 9 carbon atoms, $R_6$ is the group —$CH_2CH_2$—, o is an integer from about 10 to about 20 and X is a compatible cation. Yet another preferred surfactant in the group is a sodium salt having the formula

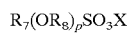

wherein $R_7$ is an alkyl group having in the range of from about 5 to about 20 carbon atoms, $R_8$ is the group —$CH_2CH_2$—, p is an integer in the range of from about 10 to about 40 and X is a compatible cation. A particularly preferred surfactant of this type is the sodium salt of a sulfonated compound derived by reacting a $C_{12}$ to $C_{15}$ alcohol with about 15 moles of ethylene oxide having the formula

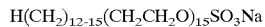

which is commercially available under the name "AVANEL S150™" from PPG Mazer, Mazer Chemicals, a Division of PPG Industries, Inc., of Gurnee, Ill.

Of the various latex stabilizing surfactants described above which can be used, ethoxylated nonylphenol containing in the range of from about 15 to about 40 moles of ethylene oxide and the sodium salt of a sulfonated and ethoxylated compound having the formula $H(CH_2)_{12-15}$ $(CH_2CH_2O)_{15}SO_3Na$ are preferred, with the latter being the most preferred.

When a latex stabilizing surfactant is included in the sealing compositions of this invention, it is added in an amount up to about 35% by weight of the aqueous rubber latex included therein, i.e., in an amount in the range of from about 3% to about 6% by weight of the compositions.

The third sealing composition described above, i.e., the composition containing a water swellable clay, a silane coupling agent, an epoxy resin and a hardening agent, can include one or more water swellable clays including, but not limited to sodium bentonite, attapulgite, fuller's earth and sepiolite. Of these, bentonite is preferred. The water swellable clay utilized is included in the sealing composition in an amount in the range of from about 10% to about 50% by weight of the composition.

The silane coupling agent included in the sealing composition strengthens the bond between subterranean formation surfaces and the hardened sealing composition. While various silane compounds can be used, particularly suitable silanes include N-2-(aminoethyl)-3-aminopropyltrimethoxysilane, aminopropyltriethoxysilane and 3-aminopropyltrimethoxysilane. Of these, N-2-(aminoethyl)-3-aminopropyltrimethoxysilane is preferred which is commercially available under the tradename "SILANE A1120™" from the Whitco Corporation of Greenwich, Conn. The silane coupling agent is included in the sealing composition in an amount in the range of from about 0.1% to about 5% by weight of the composition.

A variety of other components can be included in the sealing compositions of this invention to provide particular properties required for specific applications. For example, in the first and second sealing compositions described above, the polymerized rubber can be vulcanized (crosslinked) by including a vulcanizing agent such as sulfur therein. Inert fillers can be included in the sealing compositions to increase the downhole yield of the compositions and/or provide additional hardness to the sealing compositions. Examples of such fillers are silica flour, silica fume, pozzolans and the like. In applications where a well bore is to be plugged and not subsequently drilled out, cement such as Portland cement can be added to the sealing compositions. Another component which can be added to the sealing compositions is a deemulsifying surfactant which functions to break water in oil emulsion drilling fluids. While such an emulsion breaker is generally not needed in that when a sealing composition of this invention contacts an inverted emulsion drilling fluid, it functions itself to break the drilling fluid into its oil and water components. Some inverted emulsions utilizing synthetic oils are very difficult to break and the presence of a separate deemulsifying agent in the sealing composition is helpful.

The sealing compositions can also be foamed with nitrogen or other suitable gas in the presence of a foaming agent and foam stabilizer for reducing the densities of the compositions, preventing fluid loss and aiding in the diversion of the compositions into zones to be sealed. Suitable foaming agents which can be used are one or more sulfonated linear alcohols or a cocoamidobetaine. A suitable foam stabilizer is comprised of a mixture of methoxypolyethylene glycols. As is well understood by those skilled in the art, a variety of other foaming agents and foam stabilizers can also be used.

A preferred sealing composition of this invention is comprised of water present in an amount of from about 30% to about 42% by weight of the composition, an aqueous 25%:75% by weight styrene/butadiene latex which contains water in an amount of about 50% by weight of the latex present in an amount in the range of from about 10% to about 12% by weight of the composition, a latex stabilizer comprised of the sodium salt of a sulfonated and ethoxylated compound having the formula $H(CH_2)_{12-15}(CH_2CH_2O)_{15}SO_3Na$ present in an amount in the range of from about 3% to about 6% by weight of the composition, an alkyl quaternary ammonium bentonite clay present in an amount in the range of from about 15% to about 19% by weight of the composition, sodium carbonate present in an amount in the range of from about 3.3% to about 3.7% by weight of the composition, an epoxy resin comprised of a condensation product of epichlorohydrin and bisphenol A present in an amount in the range of from about 5% to about 20% by weight of the composition, an epoxy resin hardening agent comprised of an aliphatic or aromatic amine present in an amount in the range of from about 10% to about 20% by weight of the composition, welan gum biopolymer present in an amount in the range of from about 0.1% to about 0.2% by weight of the composition, a dispersing agent comprised of the condensation reaction product of acetone, formaldehyde and sodium sulfite present in an amount in the range of from about 0.4% to about 0.47% by weight of the composition and a defoaming agent comprised of polymethylsiloxane present in an amount in the range of from about 0.8% to about 1.2% by weight of the composition.

Another preferred sealing composition of this invention is comprised of an aqueous 25%:75% by weight styrene/butadiene latex which contains water in an amount of about 50% by weight of the latex present in an amount in the range of from about 40% to about 50% by weight of the sealing composition, a latex stabilizing surfactant comprised of the sodium salt of a sulfonated and ethoxylated compound having the formula $H(CH_2)_{12-15}(CH_2CH_2O)_{15}SO_3Na$ present in an amount in the range of from about 5% to about 15% by weight of the sealing composition, an epoxy resin comprised of a condensation product of epichlorohydrin and bisphenol A, an epoxidized bisphenol A novolac resin or one or more epoxide containing liquids selected from the group of the diglycidyl ether of 1,4-butanediol, the diglycidyl ether of neopentylglycol or the diglycidyl ether of cyclohexanedimethanol present in an amount in the range of from about 40% to about 50% by weight of the sealing composition and an epoxy hardening agent comprised of an aliphatic or aromatic amine present in an amount in the range of from about 5% to about 30% by weight of the sealing composition.

Yet another preferred sealing composition is comprised of a water swellable clay comprised of sodium bentonite present in an amount in the range of from about 20% to about 50% by weight of the sealing composition, a silane coupling agent comprised of N-2-(aminoethyl)-3-aminopropyltrimethoxysilane present in an amount in the range of from about 0.1% to about 5% by weight of the sealing composition, an epoxy resin comprised of a condensation product of epichlorohydrin and bisphenol A, one or more epoxide containing liquids selected from the group of the diglycidyl ether of 1,4-butanediol, the diglycidyl ether of neopentylglycol or the diglycidyl ether of cyclohexanedimethanol present in an amount in the range of from about 40% to about 50% by weight of the sealing composition and an epoxide hardening agent comprised of an aliphatic or aromatic amine present in an amount in the range of from about 5% to about 30% by weight of the sealing composition.

The sealing compositions of this invention can be prepared in accordance with any of the well known mixing techniques so long as the latex and latex stabilizing surfactant (if used) are not directly admixed without prior dilution by other liquids. In a preferred method, water (if used) is first introduced into a blender. The defoamer and latex stabilizing surfactant (if used) are then sequentially added with suitable agitation to disperse the constituents. The epoxy resin, the hardening agent for the resin and other liquid additives are then added followed by the dry solids. The mixture is agitated for a sufficient period of time to mix the components and form a pumpable non-foamed slurry. The aqueous rubber latex (if used) is added last and mixed with the sealing composition just prior to pumping the composition.

The methods of sealing a subterranean zone penetrated by a well bore using the sealing compositions described above basically comprise the steps of preparing a sealing composition, introducing the sealing composition into the subterranean zone by way of the well bore, and then allowing the sealing composition to harden into a firm but resilient sealing mass in the zone. Generally, the sealing composition is prepared in mixing apparatus on the surface and then pumped down the well bore into the zone to be sealed at a high pressure whereby the viscous mass formed in the well bore is squeezed into fractures and vugs. A fluid pressure above the fracture gradient can also be used in some applications to fracture the zone being sealed and force the sealing composition into the fractures thereby increasing the overall strength of the zone.

The methods of sealing a subterranean zone using the second and third sealing compositions described above are carried out so that the sealing compositions do not contact the oil or water based drilling fluids in the well bore until they reach the open hole lost circulation zone of the well bore. That is, when the second sealing composition described above is used, i.e., a sealing composition comprised of an aqueous rubber latex, a latex stabilizing surfactant, an epoxy resin or one or more epoxide containing liquids and a hardening agent, the following procedure is utilized.

With the well bore filled with oil or water based drilling fluid, the open bottom end of the drill string or a work string (hereinafter referred to as the "pipe string") is positioned about one hundred feet above the lost circulation zone. A spacer of water is pumped into the pipe string followed by the sealing composition which is followed by another spacer of water. When the first spacer reaches the bottom of the pipe string, the pumping of the sealing composition is stopped and the oil or water based drilling fluid is pumped through the annulus at a rate approximately twice the rate at which the sealing composition was being pumped. When the drilling fluid pumping pressure increases, the pumping of the sealing composition is continued until the sealing composition has been pumped into the open hole zone of the well bore. The pipe string is then moved upwardly away from the lost circulation zone. The pumping of the drilling fluid is continued until the fracture initiation pressure is reached. Drilling fluid is then circulated through the pipe string to remove sealing composition from the inside surfaces thereof, and the sealing composition is allowed to harden. Thereafter, the well bore is drilled through the sealing composition and normal drilling is continued.

When the third sealing composition is used, i.e., a sealing composition comprised of a water swellable clay, a silane coupling agent, an epoxy resin or one or more epoxide containing liquids and a hardening agent, the procedure followed is the same as above except that the well is full of water based drilling fluid and oil spacers are utilized instead of water spacers.

As previously mentioned, the sealing compositions of this invention enter the weakest portions of the zone first followed by other portions including those where fluids crossflow through the well bore or blow-out into the well bore. The sealing compositions stop drilling fluid losses and allow high drilling fluid densities to be utilized when needed while drilling ahead. Once the sealing compositions have been placed and form a firm but resilient sealing mass in a subterranean zone, they increase the fracture gradient to a higher level that can eliminate the need for intermediate casing, drilling liners and the like. Because the sealing compositions readily divert to other weak zones in the well bore, the integrity of the entire well bore is improved by the sealing compositions. In some applications it may be necessary to pump an activator fluid, e.g., an aqueous calcium chloride solution and/or oil ahead of the sealing composition into the zone to be sealed so that the sealing composition will react to form a viscous mass prior to being squeezed into the zone.

In order to further illustrate the compositions and methods of the present invention, the following examples are given.

EXAMPLE 1

A sealing composition of this invention (the first sealing composition described above) was prepared comprised of water present in an amount of about 3.32% by weight of the composition, an aqueous 25%:75% by weight styrene/butadiene latex which contained water in an amount of about 50% by weight of the latex present in an amount of about 3.32% by weight of the composition, a latex stabilizer comprised of the sodium salt of a sulfonated and ethoxylated compound having the formula $H(CH_2)_{12-15}(CH_2CH_2O)_{15}SO_3Na$ present in an amount of about 0.67% by weight of the composition, an alkyl quaternary ammonium bentonite clay present in an amount of about 3.6% by weight of the composition, sodium carbonate present in an amount of about 0.36% by weight of the composition, welan gum biopolymer present in an amount of about 0.03% by weight of the composition, a dispersing agent comprised of the condensation reaction product of acetone, formaldehyde and sodium sulfite present in an amount of about 0.05% by weight of the composition and a defoaming agent comprised of polymethylsiloxane present in an amount of about 0.002% by weight of the composition. Three different epoxy resins identified in the Table below were combined with portions of the above described compositions along with a diethyltoluenediamine epoxy resin hardening agent in the amounts shown in the Table below. The three compositions were each mixed at 140° F. for the time required for them to reach a viscosity of 100 $B_c$. Portions of the compositions were cured at 140° F. for 72 hours and then tested for compressive strength. Additional portions of the composition were mixed with equal volumes of a water-in-oil emulsion and the resulting mixtures were cured at 140° F. for 72 hours after which their compressive strengths were determined. The results of these tests are shown in the Table below.

| Composition Tested | Amount of Epoxy Resin in the Composition, % by weight of the Composition | Amount of Hardening Agent in the Composition, % by weight of the Composition | Time Required at 140° F. to Reach 100 $B_c$ Viscosity, hr:min | Compressive Strengths After 72 hrs at 140° F., psi | |
|---|---|---|---|---|---|
| | | | | Without Water-in-oil Emulsion | With Water-in-oil Emulsion |
| A[1] | 58 | 12.2 | 4:00 | 40[4] | 12[4] |
| B[2] | 58 | 14.3 | 3:50 | 27[4] | 10[4] |
| C[3] | 58 | 12.2 | 3:50 | 7[4] | 5[4] |

[1]The composition contained an epoxy resin comprised of the condensation product of epichlorohydrin and bisphenol A and was added as a non-ionic aqueous dispersion commercially available from Shell Chemical Company under the trade designation "EPI-REZ ®-3510-W-60."
[2]The composition contained an epoxy resin comprised of the condensation product of epichlorohydrin and bisphenol A and was added as a non-ionic aqueous dispersion commercially available from Shell Chemical Company under the trade designation "EPI-REZ ®-3522-W-60."
[3]The composition contained an epoxy resin comprised of an epoxidized bisphenol A novolac resin and was added as a non-ionic aqueous dispersion commercially available from Shell Chemical Company under the trade designation "EPI-REZ ®-5003-W-55."
[4]The cured composition was firm but resilient and retained its shape.

As can be seen in the Table above, the compositions of the present invention form firm resilient sealing masses which retain their shape and have good compressive strengths.

EXAMPLE 2

Another sealing composition of this invention (the second composition described above) was prepared and mixed with an equal portion of a synthetic oil based drilling fluid. The resulting mixture was comprised of an aqueous 25%:75% by weight styrene/butadiene latex which contained water in an amount of about 50% by weight of the latex present in the mixture in an amount of about 20.8% by weight of the mixture, a latex stabilizer comprised of the sodium salt of a sulfonated and ethoxylated compound having the formula $H(CH_2)_{12-15}(CH_2CH_2O)_{15}SO_3Na$ present in an amount of about 4.2% by weight of the mixture, an epoxy resin comprised of an aqueous dispersion of the condensation product of epichlorohydrin and bisphenol A ("EPI-REZ®-3510-W-60") present in an amount of about 20% by weight of the mixture, an epoxy resin hardening agent comprised of diethyltoluenediamine present in an amount of about 5% by weight of the mixture and the synthetic oil based drilling fluid present in an amount of about 50% by weight of the mixture. A portion of the mixture was mixed at 140° F. for the time required for it to reach a viscosity of 100 $B_c$. Another portion of the mixture was then cured at 140° F. for 72 hours after which its compressive strength was determined.

The time required to reach 100 $B_c$ was 4 hrs:25 min. and the compressive strength of the mixture was 52 psi.

EXAMPLE 3

The third sealing composition described above was prepared and mixed with an equal portion of a water based drilling fluid. The resulting mixture was comprised of sodium bentonite present in the mixture in an amount of 6% by weight of the mixture, a silane coupling agent, i.e., N-2-(aminoethyl)-3-aminopropyltrimethoxysilane present in an amount of 0.5% by weight of the mixture, an epoxy resin comprised of an aqueous dispersion of the condensation product of epichlorohydrin and bisphenol A present in an amount of about 34% by weight of the mixture, an epoxy resin hardening agent comprised of diethyltoluenediamine present in an amount of about 9.5% by weight of the mixture and the water based drilling fluid present in an amount of about 50% by weight of the mixture.

The time required for the mixture to reach a viscosity of 100 $B_c$ was 3 hrs:30 min. and the compressive strength of the mixture was 38 psi.

Thus, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. An improved sealing composition for sealing a subterranean zone penetrated by a well bore consisting essentially of:
    an aqueous rubber latex;
    a latex stabilizing surfactant;
    an epoxy resin; and
    a hardening agent for said epoxy resin.

2. The composition of claim 1 wherein said aqueous rubber latex is present in an amount in the range of from about 30% to about 70% by weight of said composition.

3. The composition of claim 2 wherein said aqueous rubber latex is an aqueous styrene-butadiene latex.

4. The composition of claim 2 wherein said aqueous rubber latex is an aqueous 25%:75% by weight styrene-butadiene latex which contains water in an amount of about 50% by weight of said latex.

5. The composition of claim 1 wherein said latex stabilizing surfactant is present in an amount in the range of from about 3% to about 6% by weight of said composition.

6. The composition of claim 5 wherein said latex stabilizing surfactant is selected from the group consisting of nonylphenol ethoxylated with in the range of from about 15 to about 40 moles of ethylene oxide and the sodium salt of a sulfonated and ethoxylated compound having the formula $H(CH_2)_{12-15}(CH_2CH_2O)_{15}SO_3Na$.

7. The composition of claim 1 wherein said epoxy resin is present in an amount in the range of from about 30% to about 70% by weight of said composition.

8. The composition of claim 7 wherein said epoxy resin is selected from the group consisting of a condensation product of epichlorohydrin and bisphenol A, an epoxidized bisphenol A novolac resin, the diglycidyl ether of 1,4-butanediol, the diglycidyl ether of neopentyl glycol, the diglycidyl ether of cyclohexanedimethanol and mixtures thereof.

9. The composition of claim 7 wherein said epoxy resin is comprised of the condensation product of epichlorohydrin and bisphenol A.

10. The composition of claim 1 wherein said hardening agent is present in an amount in the range of from about 5% to about 30% by weight of said composition.

11. The composition of claim 10 wherein said hardening agent is selected from the group consisting of aliphatic amines, aromatic amines, carboxylic acid anhydrides and mixtures thereof.

12. The composition of claim 10 wherein said hardening agent is selected from the group of isophoronediamine, diethyltoluenediamine, tris(dimethylaminoethylphenol) and mixtures thereof.

13. An improved sealing composition for sealing a subterranean zone penetrated by a well bore comprising:

an aqueous 25%:75% by weight styrene/butadiene latex which contains water in an amount of 50% by weight of the latex present in an amount in the range of from about 40% to about 50% by weight of said composition;

a latex stabilizing surfactant comprised of the sodium salt of a sulfonated and ethoxylated compound having the formula $H(CH_2)_{12-15}(CH_2CH_2O)_{15}SO_3Na$ present in an amount in the range of from about 5% to about 15% by weight of said composition;

an epoxy resin selected from the group consisting of a condensation product of epichlorohydrin and bisphenol A, an epoxidized bisphenol A novolac resin, the diglycidyl ether of 1,4-butanediol, the diglycidyl ether of neopentyl glycol, the diglycidyl ether of cyclohexanedimethanol and mixtures thereof present in an amount in the range of from about 40% to about 50% by weight of said composition; and an epoxy hardening agent selected from the group consisting of isophoronediamine, diethyltoluenediamine, tris(dimethylaminoethylphenol) and mixtures thereof present in an amount in the range of from about 5% to about 30% by weight of said composition.

* * * * *